United States Patent [19]

Wayne

[11] Patent Number: 4,784,490
[45] Date of Patent: Nov. 15, 1988

[54] HIGH THERMAL STABILITY PLANE MIRROR INTERFEROMETER

[75] Inventor: Kenneth J. Wayne, Saratoga, Calif.
[73] Assignee: Hewlett-Packard Company, Palo Alto, Calif.
[21] Appl. No.: 20,921
[22] Filed: Mar. 2, 1987
[51] Int. Cl.$^4$ .............................................. G01B 9/02
[52] U.S. Cl. .................................. 356/351; 356/358
[58] Field of Search ................ 356/349, 351, 358, 363

[56] References Cited

U.S. PATENT DOCUMENTS 3,788,746 1/1974 Baldwin et al. ...................... 356/349
4,693,605 9/1987 Sommargren ........................ 356/349

Primary Examiner—F. L. Evans
Assistant Examiner—Matthew W. Koren
Attorney, Agent, or Firm—James M. Williams

[57] ABSTRACT

An optical system for an interferometer compensates for changes in temperature by incorporating optics in which the reference and measurement beams follow different but optically equivalent paths through optical elements that are in thermal equilibrium. The optical elements of the interferometer are so arranged that the reference beam and the measurement beam follow equivalent optical path lengths through the interferometer, whose elements are in thermal equilibrium. That is, the path lengths through the high refractive index media of the optics are the same length and refractive index, but do not follow the same path. Because the beams are not constrained to follow the same path, fewer optical elements are needed and shorter OPLs can be used resulting in less complexity, better optical efficiency, easier alignment and lower cost.

3 Claims, 2 Drawing Sheets

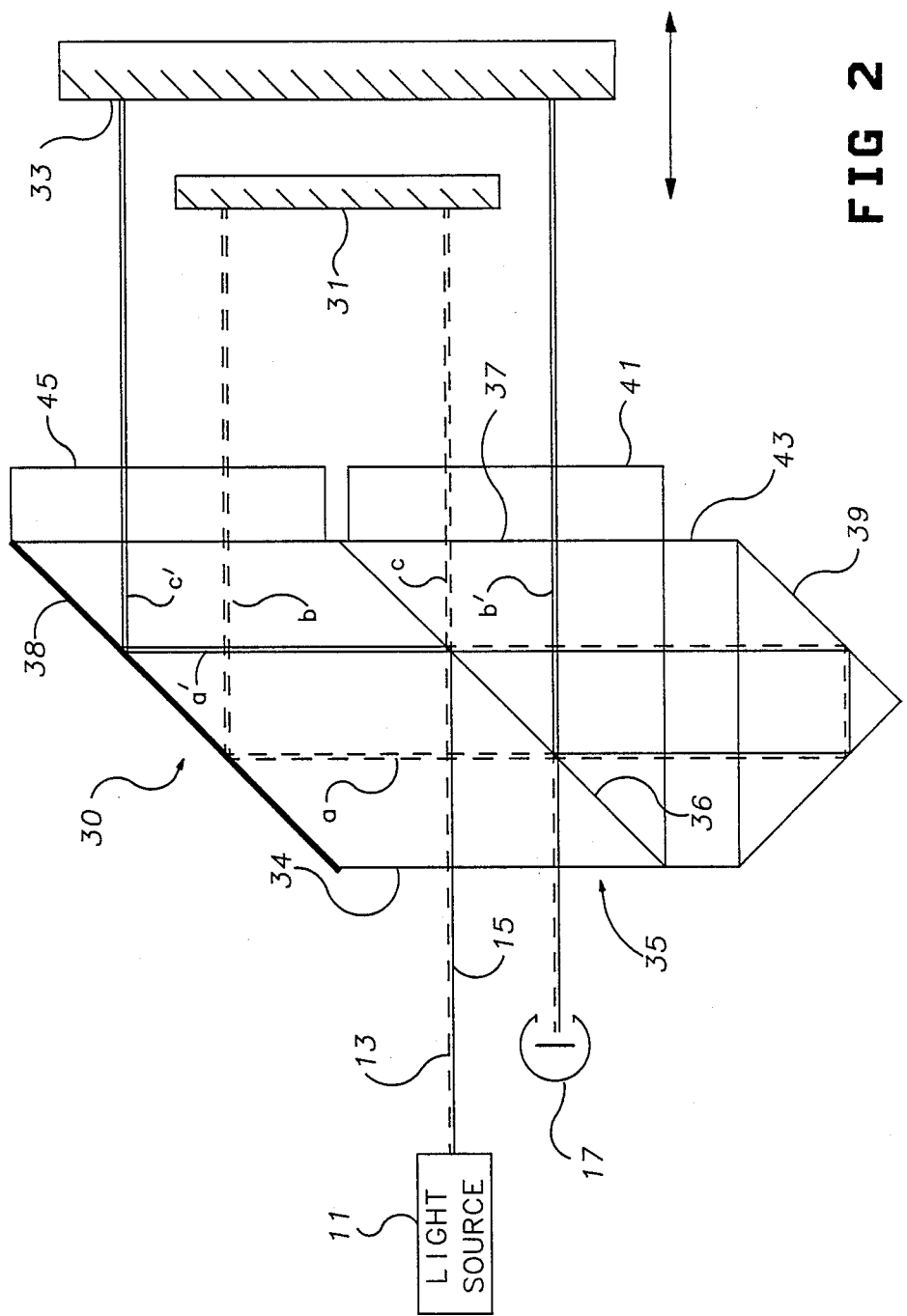

HIGH THERMAL STABILITY PLANE MIRROR INTERFEROMETER

BACKGROUND AND SUMMARY OF THE INVENTION

An interferometer measures the change in distance between a reference point and a movable point by measuring the change in optical path length between the two points. The change in the optical path length is measured by counting the number of fringes in an interference pattern caused by a measurement beam reflected from the movable point and a reference beam that follows a fixed path.

The optical path length (OPL) is the product of the length of the beam's path and the refractive index of the medium through which the beam passes. Generally, the OPL is made up of a number of segments through air, which has a low refractive index, and a number of segments through glass, or some other medium of high refractive index.

If the OPL changes due to the effects of a change in temperature on the refractive index of the optical elements of the measuring instrument, the instrument will register an erroneous distance change, just as if the distance to be measured had changed.

Early efforts to eliminate thermally induced errors were directed to the largest source of error, the mechanical supports for the optics. To compensate for temperature variations, the supports were arranged so the change in position of the optical components in the reference beam path was the same as the change for the components in the measurement beam path.

Recently, interferometer instruments have been used in applications demanding increased measurement accuracy, for example wafer steppers for large scale integrated circuits. This has led to a need to further compensate for thermally induced errors.

One proposed solution, is described in co-pending U.S. application Ser No. 604,702, "Minimum Deadpath Interferometer and Dilatometer", filed Apr. 27, 1984 now U.S. Pat. No. 4,711,574 and assigned in common with this application. The device disclosed incorporates interferometer optics with a common path for the reference and measurement beams. With the beams following the same path through the optics, changes in either the refractive index or the dimensions of the optical elements affect the OPL of both beams equally. This technique is particularly suitable for differential interferometers. However, it requires complex optics, which lower the optical efficiency of the instrument and are relatively expensive.

An object of this invention is to provide a high thermal stability interferometer that is relatively low cost, has high optical efficiency and less complex optics, and is easy to align and use.

The preferred embodiment of the present invention compensates for changes in temperature by incorporating optics in which the reference and measurement beams follow different but optically equivalent paths through optical elements that are in thermal equilibrium. That is, the path lengths through the high refractive index medium of the optics are the same length, but do not follow the same path. Because the beams are not constrained to follow the same path, fewer optical elements are needed and shorter OPLs can be used resulting in less complexity, better optical efficiency, easier alignment and lower cost.

BRIEF DESCRIPTION OF THE DRAWINGS

FIG. 2 is a schematic representation of an interferometer constructed in accordance with an alternative embodiment of the invention, showing the paths of the reference and measurement beams.

DETAILED DESCRIPTION OF THE INVENTION

Figure 1:
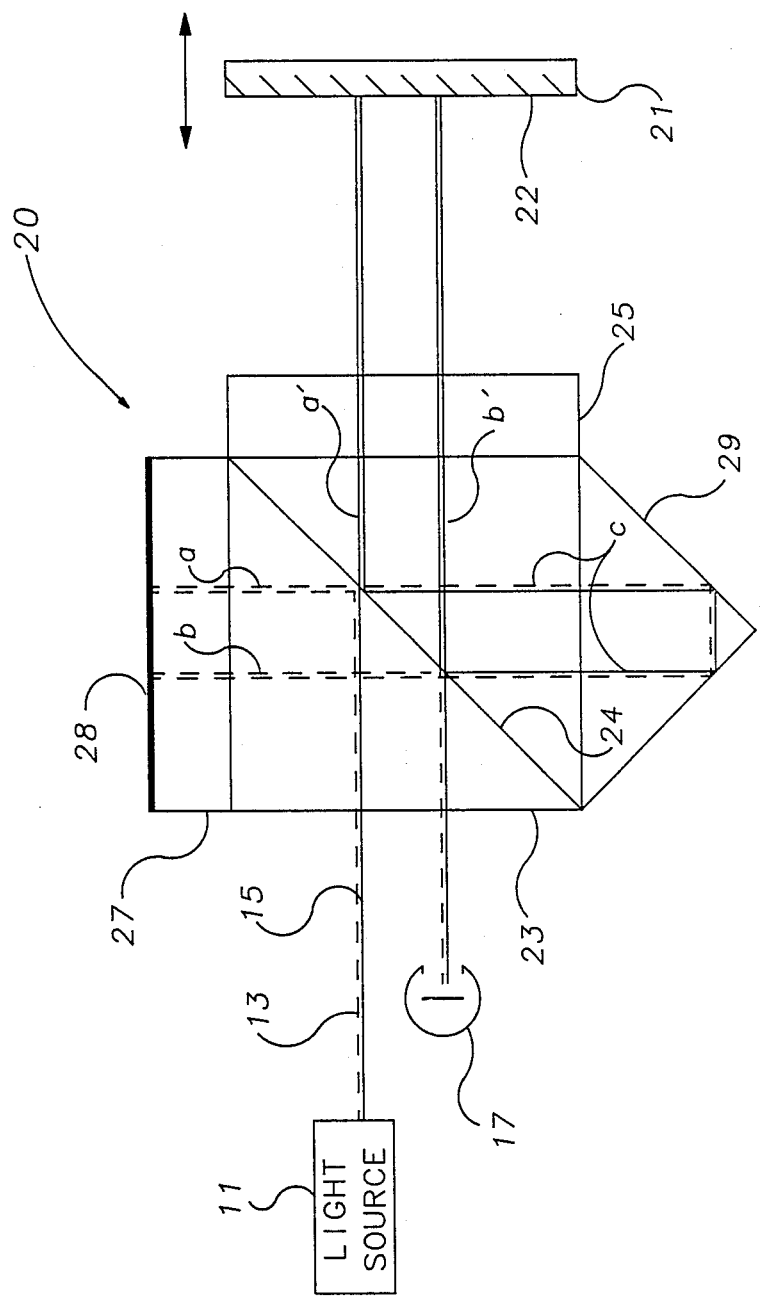
FIG. 1 is a schematic representation of an interferometer constructed in accordance with the preferred embodiment of the invention, showing the paths of the reference and measurement beams.

The preferred embodiment of the invention is a plane mirror interferometer shown in FIG. 1. The interferometer uses a light source 11 to produce a reference beam 13 and a measurement beam 15. Light source 11 is preferably a two-frequency laser producing a reference beam 13 of frequency $f_1$ linearly polarized in the plane of the drawing and a measurement beam of frequency $f_2$ linearly polarized perpendicular to the plane of the drawing. The reference beam 13 and the measurement beam 15 are directed to the optical assembly 20 of the interferometer, which reflects reference beam 13 back to detector 17 and transmits measurement beam 15 to a movable measurement mirror 21. The mirror surface 22 of movable mirror 21 reflects the measurement beam back to optical assembly 20 and then back to detector 17. Detector 17 uses a mixing polarizer to mix the two beams and a photodetector to detect the fringes of the resulting interference pattern.

According to the teachings of the invention, the optical elements of optical assembly 20 are so arranged that the reference beam 13 and the measurement beam 15 follow equivalent optical path lengths through the optical assembly 20, whose elements are in thermal equilibrium. Optical assembly 20 comprises a polarizing beam splitter 23 with a beam splitting surface 24 at a 45 degree angle to the incident light beams, quarter wave plates 25 and 27 and a cube corner 29. Quarter wave plate 25 is transparent on both surfaces while quarter wave plate 27 has a high reflectance coating on one of its surfaces. Quarter wave plates 25 and 27 have the same thickness and are made of the same material. Quarter wave plates 25 and 27 effectively rotate the plane of polarization of the beams by 90 degrees each time the beams traverse a quarter wave plate twice. Thus, the elements in the reference path of optical assembly 20 are of the same material and size as their counterparts in the measurement path.

The path of reference beam 13 is reflected by beam splitting surface 24 to quarter wave plate 27 which changes its polarization state. Then beam 13 passes through the polarizing beam splitter 23 is reflected by cube corner 29 back through polarizing beam splitter 23 again to quarter wave plate 27 which again changes it polarization state. Next, beam 13 is reflected by beam splitting surface 24 on a path parallel to its original path towards detector 17.

Measurement beam 15, being polarized perpendicular to reference beam 13, passes through beam splitting surface 24 and through quarter wave plate 25 to movable mirror 21 which reflects it back toward optical assembly 20, again through quarter wave plate 25. This time beam 15 is reflected by beam splitting surface 24 toward cube corner 29 which returns splitting surface 24 which directs measurement beam 15 back through quarter wave plate 25 to moveable measurement mirror 21 and then back through quarter wave plate 25. With the polarization state changed one more time, measurement beam 15 passes through beam splitting surface 24 to detector 17.

It can be seen from an examination of FIG. 1 that where reference beam 13 and measurement beam 15 do not follow a common path, their path lengths through the elements of optical assembly 20 are equivalent. In particular, path a of reference beam 13 through the beam splitter and quarter wave plate 27 is the same length as path a' of measurement beam 15 through the beam splitter and quarter wave plate 25. Similarly, path b of reference beam 13 is the same length as path b' of measurement beam 15. And path c from beam splitter surface 24 to cube corner 29 and return is common to both reference beam 13 and measurement beam 15. Thus, if the temperature of optical assembly 20 changes affecting the dimensions and the refractive index of the optical elements, the optical pathlengths of reference beam 13 and measurement beam 15 will be equally affected if the elements of optical assembly 20 remain in thermal equilibrium.

An alternative embodiment showing an application of the invention to differential measurements is shown in FIG. 2. Here the optics are adapted to allow the reference beam to be directed to a reference mirror 31 located close to the movable mirror 33. This minimizes the "dead path" difference between the measurement beam and the reference beam further compensating for thermally induced errors in the air path between the optical assembly and the movable mirror 33.

In the embodiment of FIG. 2, the optical assembly 30 includes a polarizing beam splitter 35, which is a compound prism comprising a porro prism 37 having a triangular cross section, with a polarizing beam splitter surface 36 at a 45 degree angle to the incident beams, connected to a parallelogram prism 34.

Beam splitter 35 has a mirrored surface 38 which is parallel to beam splitting surface 36. Optical assembly 30 also includes cube corner 39 and quarter wave plates 41, 43 and 45. Transparent quarter wave plates 41, 43 and 45 have the same thickness and are made of the same material.

Reference beam 13 is directed to beam splitter 35 where on its first pass, it passes through beam splitting surface 36 out through quarter wave plate 41 to reference mirror 31 where it is reflected back towards the beam splitter 35 again through quarter wave plate 41. With changed polarization state, beam 13 is now reflected by surface 36 down through quarter wave plate 43 to cube corner 39 which reflects it back through quarter wave plate 43 again with changed polarization state. Beam 13 now passes through surface 36 to mirrored surface 38 of beam splitter 35 which directs it through quarter wave plate 45 to reference mirror 31 back through quarter wave plate 45 to surface 38 which directs the beam back down towards surface 36 where it is reflected to detector 17.

Measurement beam 15, polarized perpendicular to beam 13, is reflected by surface 36 on its first pass, towards mirrored surface 38 which directs the beam through quarter wave plate 45 to movable measurement mirror 33, back through quarter wave plate 45 to mirrored surface 38. With changed polarization state as a result of passing through the quarter wave plate, the beam 15 is directed down and passes through surface 36, through quarter wave plate 43 to cube corner 39, back through quarter wave plate 43 again with changed polarization state to surface 36 which reflects beam 15 through quarter wave plate 41 to movable measurement mirror 33, then back through quarter wave plate 41, where finally with its polarization state changed again, the measurement beam 15 passes through surface 36 to detector 17.

An inspection of the paths of reference beam 13 and measurement beam 15 in FIG. 2 reveals that where the beams follow paths that are not common, their lengths are equivalent. Thus, paths a, b and c of reference beam 13 have the same length as paths a', b' and c' of measurement beam 15.

I claim:

1. An interferometer having high thermal stability, comprising:

light source means for producing a coherent light beam;

a light detector;

beam splitter means for separating the coherent light beam into a measurement beam and a reference beam;

reflecting means, having substantially no optical path length, mounted on a movable measurement plane; and optical means having optical elements in thermal contact and in thermal equilibrium with the beam splitter, for cooperating with the beam splitter means to direct the reference beam along a reference path to said detector, and to direct the measurement beam along a measurement path to said detector, said measurement path including the round trip distance to the reflecting means on the movable measurement plane; and wherein the reference path passes through different optical elements than the measurement path, but the reference path and the measurement path have substantially the same optical path length through said optical means and pass through optical elements of substantially the same refractive index, so that the thermally induced changes in the optical path length of the reference path and the optical path length of the measurement path through the beam splitter and the optical means compensate one another.

2. The interferometer of claim 1 wherein:

the coherent light beam comprises a plane polarized reference component and a measurement component plane polarized perpendicular to the reference component;

the beam splitter has a square cross section with a first surface through which the light beams enter from the light source means, a second surface opposite the first surface, third and fourth surfaces adjacent the first surface, and with a plane polarizing beam splitter surface diagonal to the first surface, and the optical means comprises a transparent quarter wave plate mounted on the second surface, a cube corner mounted on the third surface, and a reflective quarter wave plate mounted on the fourth surface;

the reference path passes sequentially through the beam splitter, twice through the reflective quarter wave plate, once through the beam splitter, the cube corner, the beam splitter, twice through the reflective quarter wave plate, once through the beam splitter, and to the detector; and the measurement path passes sequentially through the beam splitter, the transparent quarter wave plate, to the reflecting means, through the transparent quarter wave plate, the beam splitter, the cube corner, the beam splitter, the transparent quarter wave plate, to the reflecting means, through the transparent quarter wave plate, the beam splitter, and to the detector.

3. The interferometer of claim 1 wherein:

the coherent light beam comprises a plane polarized reference component and a measurement component plane polarized perpendicular to the reference component;

the beam splitter is a compound prism comprising a porro prism having altitude, base and hypotenuse surfaces, with a polarizing beam splitter on its hypotenuse surface, connected to a parallelogram prism with a first surface parallel to the altitude surface of the porro prism, through which the light beams enter from the light source means, a second surface adjacent the first surface and connected to the hypotenuse surface of the porro prism, a third surface parallel to the first surface, and a fourth surface parallel to the second surface; the optical means comprises a first transparent quarter wave plate mounted on the base surface of the porro prism, a cube corner mounted on the first transparent quarter wave plate, a second transparent quarter wave plate mounted on the altitude surface of the porro prism, a third transparent quarter wave plate mounted on the third surface of the parallelogram prism, and a reflective coating on the fourth surface of the parallelogram prism;

the interferometer further comprising a fixed reflecting means, having substantially no optical path length, mounted near the measurement plane; and the reference path passes sequentially through the beam splitter, the second quarter wave plate, to the fixed reflecting means, through the second quarter wave plate, the beam splitter, the first quarter wave plate, the cube corner, the beam splitter, to the reflective coating, through the third quarter wave plate, to the fixed reflecting means, through the third quarter wave plate, the beam splitter, and to the detector; and the measurement path passes sequentially through the beam splitter, to the reflective coating, through the third quarter wave plate, to the reflecting means on the measurement plane, through the third quarter wave plate, to the reflective coating, through the beam splitter, the first quarter wave plate, the cube corner, the beam splitter, the second quarter wave plate, to the reflecting means on the measurement plane, through the second quarter wave plate, the beam splitter, and to the detector.

* * * * *